United States Patent
Deng et al.

(10) Patent No.: US 9,686,463 B2
(45) Date of Patent: Jun. 20, 2017

(54) SYSTEMS AND METHODS FOR CONTINUOUS AUTO FOCUS (CAF)

(71) Applicant: QUALCOMM Incorporated, San Diego, CA (US)

(72) Inventors: Fan Deng, San Diego, CA (US); Lei Ma, San Diego, CA (US); Leung Chun Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/643,876

(22) Filed: Mar. 10, 2015

(65) Prior Publication Data

US 2016/0269615 A1    Sep. 15, 2016

(51) Int. Cl.
| | |
|---|---|
| H04N 5/232 | (2006.01) |
| H04N 5/225 | (2006.01) |
| G06T 7/80 | (2017.01) |
| G06T 7/38 | (2017.01) |
| G06T 7/571 | (2017.01) |

(Continued)

(52) U.S. Cl.
CPC .......... *H04N 5/23212* (2013.01); *G06T 7/11* (2017.01); *G06T 7/187* (2017.01); *G06T 7/38* (2017.01); *G06T 7/571* (2017.01); *G06T 7/80* (2017.01); *H04N 5/2253* (2013.01); *H04N 5/23293* (2013.01); *G06T 2207/10004* (2013.01); *G06T 2207/10028* (2013.01); *G06T 2207/10148* (2013.01); *G06T 2207/20221* (2013.01); *G06T 2210/12* (2013.01); *G06T 2210/61* (2013.01); *H04N 5/23216* (2013.01); *H04N 5/23219* (2013.01)

(58) Field of Classification Search
CPC .................................................. H04N 5/23212
USPC ............................................. 348/208.12, 349
See application file for complete search history.

(56) References Cited

U.S. PATENT DOCUMENTS

| | | | |
|---|---|---|---|
| 7,995,909 | B2 | 8/2011 | Ilya et al. |
| 8,036,522 | B2 | 10/2011 | Vydhynathan et al. |
| 8,698,945 | B2 | 4/2014 | Foote |

(Continued)

FOREIGN PATENT DOCUMENTS

JP    2000188713 A    7/2000

OTHER PUBLICATIONS

International Search Report and Written Opinion—PCT/US2016/019142—ISA/EPO—Jun. 1, 2016.

*Primary Examiner* — Joel Fosselman
(74) *Attorney, Agent, or Firm* — Knobbe, Martens, Olson & Bear, LLP (57) ABSTRACT

Systems and methods for continuous automatic focus are disclosed. In some aspects, an object to focus on is selected from a field of view of a camera. At least one region of the field of view that includes the object is monitored for change. Regions of the field of view that do not include the object may not be monitored, thus improving efficiency and speed. If a change in the image content of the monitored region(s) occurs, the method may trigger a focus event. If the object moves to different region(s) of the field of view, the method detects the movement and adjusts the regions of the image being monitored to maintain focus on the object. In some aspects, the size of the object is also monitored. If the size of the object changes, a focus event may be triggered, depending on whether the amount of change exceeds predetermined parameters.

15 Claims, 7 Drawing Sheets

(51) Int. Cl.
    *G06T 7/11*          (2017.01)
    *G06T 7/187*        (2017.01)

(56) References Cited

U.S. PATENT DOCUMENTS

| | | | |
|---|---|---|---|
| 2009/0009651 A1 | 1/2009 | Takayanagi | |
| 2009/0256953 A1* | 10/2009 | Yasuda | G03B 13/32 |
| | | | 348/349 |
| 2010/0086292 A1 | 4/2010 | Byun et al. | |
| 2010/0218406 A1* | 9/2010 | DeRose | A47G 33/08 |
| | | | 40/541 |
| 2011/0043681 A1* | 2/2011 | Shibagami | G02B 7/36 |
| | | | 348/349 |
| 2012/0218406 A1 | 8/2012 | Hanina et al. | |
| 2013/0293741 A1 | 11/2013 | Nishi | |
| 2014/0253785 A1 | 9/2014 | Chan et al. | |
| 2014/0362275 A1 | 12/2014 | Brunner et al. | |

\* cited by examiner

SYSTEMS AND METHODS FOR CONTINUOUS AUTO FOCUS (CAF)

FIELD

This application relates generally to imaging systems and more specifically to tracking objects for continuous automatic focus.

BACKGROUND

Autofocus systems automatically adjust the distance between a lens element and an image sensor to keep objects in focus. Many of these systems determine the best focus based on high frequency content within the image being focused. For example, a lens position that maximizes the high frequency content may represent an image with the best contrast ratio, and thus the best focus. However, existing autofocus systems may lose focus when an object moves relative to the camera. Therefore, there is a need for systems and methods that continuously and automatically maintain focus on moving objects.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include allowing tracking objects for continuous autofocus.

One aspect is a method of focusing a camera. In various embodiments the method may include sequentially capturing a first and second image of a scene. The method may further include determining a first size of a first object in the first image. The method may further include determining a second size of the first object in the second image. The method may further include focusing the camera based on a difference between the first size and the second size.

For some implementations, the method may further include determining a first bounding region includes the first object in the first image. For some implementations, the method may further include determining a second bounding region includes the first object in the second image. For some implementations, the method may further include focusing the camera based on a difference between the first bounding region and the second bounding region.

For some implementations, the method may further include focusing the camera based on a difference between an area of the first bounding region and an area of the second bounding region.

For some implementations, the method may further include determining a ratio between an area of the second bounding region and an area of the first bounding region. For some implementations, the method may further include focusing the camera based on the ratio being less than a size decrease threshold or exceeding a size increase threshold.

For some implementations, the method may further include focusing the camera if the difference exceeds a region difference threshold. For some implementations, the method may further include maintaining the focus of the camera if the difference does not exceed the region difference threshold.

For some implementations, the method may further include segmenting the first and second image into a plurality of corresponding regions. For some implementations, the method may further include determining a first region in the first image includes the first object, and a corresponding second region in the second image. For some implementations, the method may further include determining a first difference between image content in the first region and the second region. For some implementations, the method may further include focusing the camera based on the first difference in image content For some implementations, the method may further include excluding from consideration when focusing the camera, regions of the plurality of regions that are determined to not include the first object.

For some implementations, the method may further include determining a third region in the second image includes the first object. For some implementations, the method may further include capturing a third image of the object at a third time, the third time after the second time. For some implementations, the method may further include determining a fourth region in the third image corresponding to the third region. For some implementations, the method may further include determining a second difference between image content in the third region and the fourth region. For some implementations, the method may further include focusing the camera in response to the second difference in image content.

Another aspect is an imaging apparatus. The imaging apparatus may include a camera configured to sequentially capture a first and second image of a scene. The imaging apparatus may include a processor in communication with the camera. The processor may be configured to determine a first size of a first object in the first image. The processor may be further configured to determine a second size of the first object in the second image. The imaging apparatus may include a camera controller configured to focus the camera based on a difference between the first size and the second size.

For some implementations, the processor is further configured to determine a first bounding region includes the first object in the first image. For some implementations, the processor is further configured to determine a second bounding region includes the first object in the second image. For some implementations, the processor is further configured to focus the camera based on a difference between the first bounding region and the second bounding region.

For some implementations, the camera controller is further configured to focus the camera based on a difference between an area of the first bounding region and an area of the second bounding region.

For some implementations, the processor is further configured to determine a ratio between an area of the second bounding region and an area of the first bounding region. For some implementations, the camera controller is further configured to focus the camera based on the ratio being less than a size decrease threshold or exceeding a size increase threshold.

For some implementations, the camera controller is further configured to focus the camera if the difference exceeds a region difference threshold. For some implementations, the camera controller is configured to maintain the focus of the camera if the difference does not exceed the region difference threshold.

For some implementations, the processor is further configured to segment the first and second image into a plurality of corresponding regions. For some implementations, the processor is further configured to determine a first region in the first image includes the first object, and a corresponding second region in the second image. For some implementations, the processor is further configured to determine a first difference between image content in the first region and the second region. For some implementations, the camera controller is further configured to focus the camera based on the first difference in image content.

For some implementations, the processor is further configured to exclude from consideration, when focusing the camera, regions of the plurality of regions that are determined to not include the first object.

For some implementations, the processor is further configured to determine a third region in the second image includes the first object. For some implementations, the processor is further configured to capture a third image of the object at a third time, the third time after the second time. For some implementations, the processor is further configured to determine a fourth region in the third image corresponding to the third region, wherein the processor is further configured to determine a second difference between image content in the third region and the fourth region, and wherein the camera controller is further configured to focus the camera in response to the second difference in image content.

Another aspect is an imaging apparatus. The apparatus may include means for sequentially capturing a first and second image of a scene. The apparatus may include means for determining a first size of a first object in the first image. The apparatus may include means for determining a second size of the first object in the second image. The apparatus may include means for focusing the capturing means based on a difference between the first size and the second size.

For some implementations, the capturing means may include a camera. For some implementations, the first size determining means may include a processor. For some implementations, the second size determining means may include a processor. For some implementations, the focusing means may include a camera controller.

Another aspect is a non-transitory computer-readable medium storing instructions for focusing a camera, the instructions when executed that, when executed, perform a method. The method may include sequentially capturing a first and second image of a scene. The method may include determining a first size of a first object in the first image. The method may include determining a second size of the first object in the second image. The method may include focusing the camera based on a difference between the first size and the second size.

DETAILED DESCRIPTION OF CERTAIN EMBODIMENTS

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that hosts a camera. These include mobile phones, tablets, dedicated cameras, wearable computers, personal computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Autofocus systems measure a focus parameter at different distances between a lens element and an image sensor, and select the distance that optimizes the focus parameter. For example, the focus parameter may be a measure of high frequency content in a portion of a field of view, since in-focus images typically have more high frequency content than out-of-focus images. Existing systems reduce the computational load of measuring the focus parameter of the entire field of view by determining the focus parameter based on a portion of the field of view. The portion may be a center region of the field of view, a region selected by a user, or a region including an object. The object may be detected automatically (for example, using automatic face recognition) or selected by a user. Whether the center field of view, a region selected by a user, a region including an object detected automatically, or a region including an object selected by a user, focus measures for this portion of the field of view are computed at different differences between a lens element and an image sensor, and the distance that optimizes the focus parameter is selected. A controller moves the lens to the distance with the optimum focus parameter to focus the image. However, existing autofocus systems may lose focus when objects move.

An object may move within a portion of the field of view monitored by the autofocus system, or to a portion of the field of view not monitored by the autofocus system. In addition to lateral movement, an object may appear larger as it moves closer to the camera, or appear smaller as it moves farther from the camera. Each of these events may cause an object to lose focus. Therefore, a continuous autofocus system disclosed herein may trigger a focus event when the object moves.

The object to be focused on may be selected using a touchscreen, or determined automatically using image processing and pattern recognition techniques. The object may be enclosed in an enclosure, such as a bounding box or a convex hull. A bounding box, typically a small, rectangular shape that includes the object, may be used to measure focus parameters. The bounding box may be a minimum bounding box. In some aspects, the sides of the bounding box may be aligned with rows and columns of the image.

The continuous autofocus system may divide its field of view into non-overlapping monitor regions. For example, some implementations may have monitor regions consisting of four rows and four columns (4×4). In some implementations, the number of rows and columns may be equal, such as 2×2, 3×3, 4×4, 8×8, 16×16, or in some other implementations, the monitor regions may be asymmetrical, and be arranged, for example, as 2×4 or 4×2. The continuous autofocus system may monitor a subset of these regions to determine focus parameters instead of monitoring the entire field of view. Some implementations may measure one, two, three, or four regions for example. In implementations with 12 regions, for example, if only one region is monitored, just one-twelfth of the field of view is monitored.

The disclosed continuous autofocus system may first identify a subset of all the regions that may include the object. For some implementations, "including an object" may be defined to allow for an object to be included in just one region. These implementations may, for example, define including an object as including one of a centroid of the object, a center of the bounding region, a larger portion of the area of the object than any other region, or a larger portion of the area of the bounding region than any other region. For some implementations, "including an object" may be defined to allow for an object to be included in more than one region. These implementations may, for example, define including an object as including one of a portion of the object or a portion of the bounding region.

After identifying a subset of all the regions that may include the object, the disclosed system focuses the object using focus parameters for the subset. Other regions not in the subset may be excluded from consideration when focusing the camera. Once focused, the continuous autofocus system compares regions in the subset for the focused frame to corresponding region(s) in subsequent images. When there is a difference, for example, when the difference exceeds a threshold, the continuous autofocus system may trigger a focus event. If the object moves to a different region that is not in the current subset of monitored regions, then the continuous autofocus system may include the new region in the subset of regions. Additionally, other regions may be removed from the subset of regions being monitored. A focus event may also be triggered when the object moves to a different region.

In some aspects, a single region may be monitored. In these aspects, if the object spans more than one region, the monitored region for an object may be assigned based on criteria such as the region with the object centroid, a region with the center of a bounding box, or a region having the largest percentage of the object, or the region with the largest percentage of the bounding box/enclosure of the object.

The continuous autofocus system may track the size of an object since a previous focus event. The size may change, for example, if the object moves closer to or farther from the camera. The size of the object may be measured within each image directly, or in other words, based on a boundary outline of the object itself. Alternatively, a size of a bounding box/enclosure for the object may be used to estimate the relative size of the object. The change in an area of a bounding box may be used as an estimate of the change in object size since a previous focus event. For some implementations, the continuous autofocus system uses a ratio or a percent change in size since the last focus event.

Thus, some implementations trigger focus events to improve focus on moving objects when there is a change in the size of an image of an object, there is a change in which region(s) is/are being monitored, i.e. in which region(s) the object is positioned, or there is a change in the image content of the monitored region(s). The focus may also be accomplished more effectively than existing systems, and with greater computational efficiency.

Figure 1:
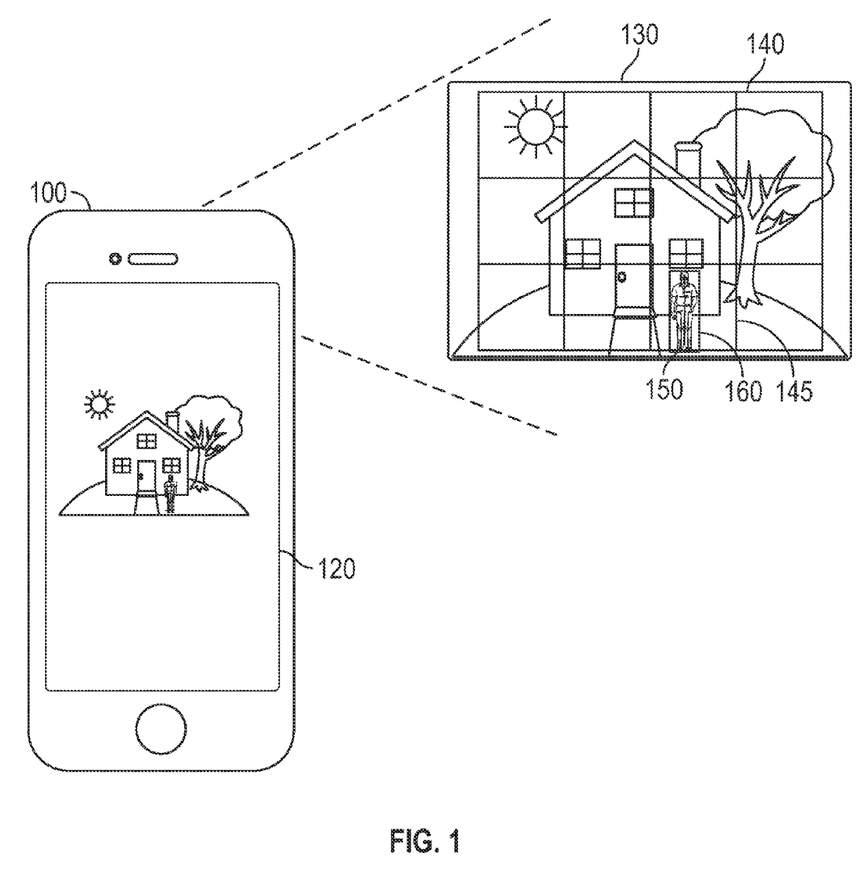
FIG. 1 illustrates an example of an apparatus (for example, a mobile communication device) that includes an imaging system that can record images of a scene.

FIG. 1 illustrates an example of an apparatus 100 (for example, a mobile communication device) that includes an imaging system that can record images of a scene. The apparatus 100 includes a display 120. The apparatus 100 may also include a camera on the reverse side of the apparatus, which is not shown. The display 120 may display images captured within the field of view 130 of the camera. Processing logic within the apparatus 100 may divide the field of view 130 into a plurality of regions with region boundaries 140. FIG. 1 shows object 150, a person, within the field of view 130. The object 150 is also within the region 145. Processing logic within the apparatus 100 may detect the object 150 and determine a bounding region that encloses the object 150. In some aspects, the determined region may be a polygon or a rectangle. As shown, processing logic within the apparatus 100 determined a bounding region (bounding box) 160 that encloses the object 150. In this example, bounding box 160 is aligned with the rows and columns of imaging elements that make up the field of view 130. In some aspects, the bounding region may be only large enough to enclose the object 150, and thus be a minimum bounding box.

Figure 2:
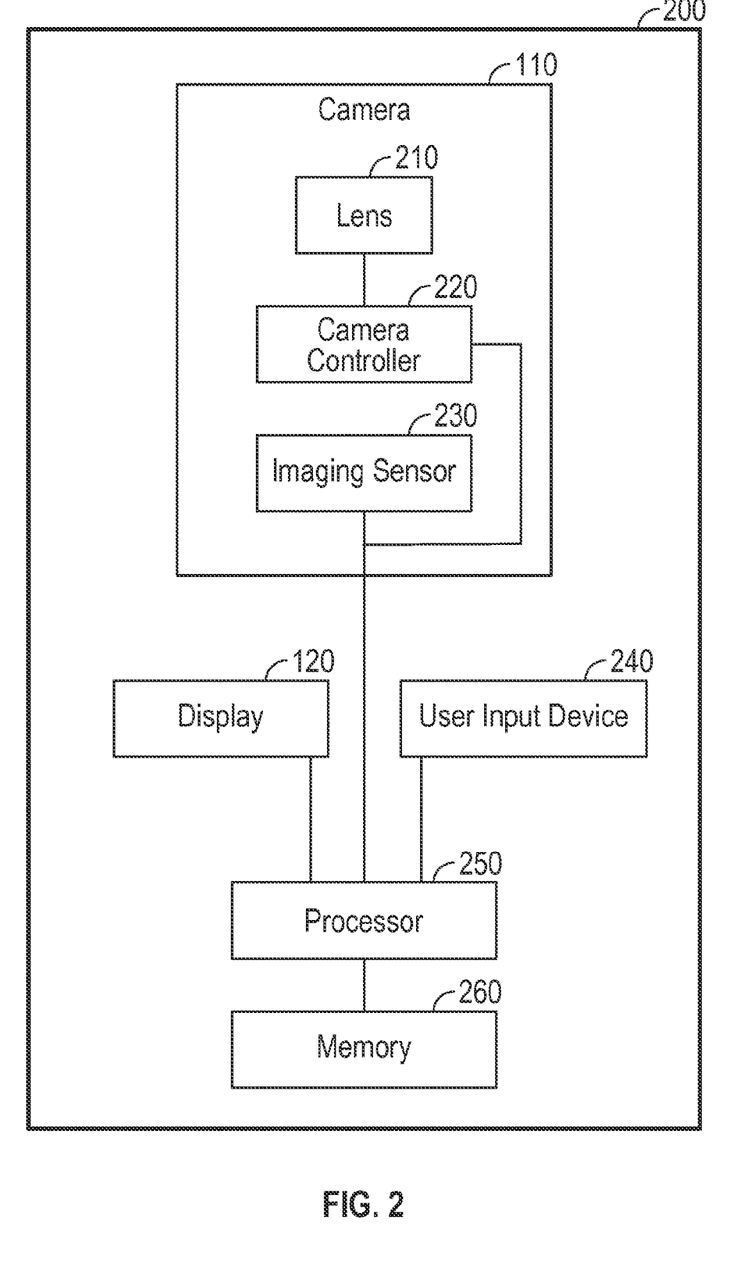
FIG. 2 is a block diagram representation of an example of an embodiment of an imaging system that tracks an object for continuous autofocus.

FIG. 2 is an internal block diagram an embodiment of the apparatus 100 shown in FIG. 1. The apparatus 100 includes a camera 110, a display 120, user input device 240, an electronic processor 250, and an electronic memory 260. The processor 250 is operably connected to the display 120, camera 110, user input device 240, and memory 260. The camera 110 includes a lens 210, a camera controller 220, and an imaging sensor 230. The camera controller 220 and imaging sensor are in communication with a processor 250.

The imaging sensor (image sensor, sensor) 230 captures images at a spatial resolution limited by the resolution of the sensor 230. The sensor 116 may comprise rows and columns of picture elements (pixels) that may use semiconductor technology, such as charged couple device (CCD) or complementary metal oxide semiconductors (CMOS) technology, that determine an intensity of incident light at each pixel during an exposure period for each image frame. In some embodiments, incident light may be filtered to one or more spectral ranges to take color images. For example, a Bayer filter mosaic on the sensor 116 may filter light using red, green and blue filters capture full color, three band images.

The camera controller 230 may operably control movement of the lens 210 (or at least one lens element) for focusing, control the size of the aperture and/or how long the aperture is open to control exposure (and/or the exposure period), and/or control sensor 230 properties (for example, gain).

The memory 260 may store processor instructions that configure the processor 250 to perform functions. For example, the instructions may configure the processor to capture one or more images using the camera 110, and to display the captured images on the display 120. The instructions may also configure the processor 250 to perform a variety of image processing tasks, including the imaging processing methods discussed herein.

For some embodiments, the processor 160 may perform (or process) functionality associated with blocks in the flowchart depicted in FIG. 3 below. For example, the processor 250 may be configured to perform (or process) select object 310 functionality, focus object 320 functionality, monitor region with object 330 functionality, determine if image in region(s) changed functionality 340, track object location 350 functionality, determine if object region(s) changed 360 functionality, change region(s) functionality, track object size 380 functionality, and/or determine if object size changed 390 functionality. In some aspects, the processor may be configured by instructions stored in the memory 260 to perform one or more functions discussed below with respect to FIG. 7.

The display 120 is configured to display images that are communicated to the display 120 from the processor 160. For some implementations, the display 120 displays user feedback, for example, annotations for touch-to-focus indicating selected frame segments. For some implementations, the display 120 displays menus prompting user input.

The user input device 240 is configured to accept user input. In some embodiments, the user input device 240 is a touch screen included in display 120. In some implementations, the touch screen 240 accepts multi-touch input from a user. In some implementations, instructions in the memory 260 may configure the processor to accept input from the user input device 240 that selects a region within an image. The selected region may contain an object the user wishes the camera to focus on. In some implementations, a plurality of regions may be superimposed onto an image displayed on the display 120. The user input device 240 may receive input selecting one of the superimposed regions. The selected region may then be used by the processor 250 to determine a focus of the camera 110.

Figure 3:
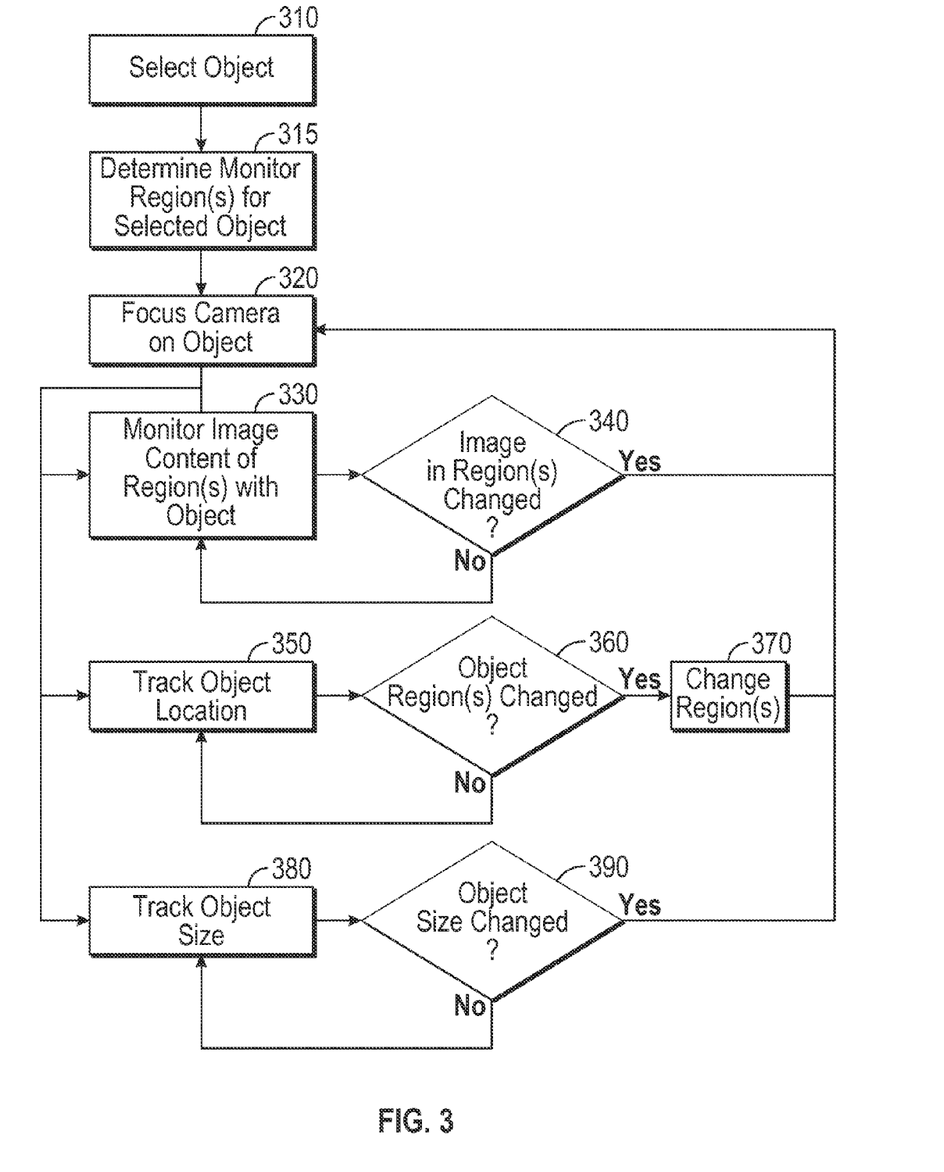
FIG. 3 is a flowchart that illustrates an example of a method for continuous autofocus.

FIG. 3 is a flowchart of an example method 300 for continuous autofocus. In block 310, method 300 selects an object. The method 300 may select the object either automatically or manually. In some aspects, processor 250 may select the object automatically using an object detection or object recognition system based on a plurality of intensity values in the image. For some implementations, the processor 250 may use face recognition techniques to identify the object. The approach taken to automatically identify an object may depend on the application or context, which may be user selectable through user input device 240.

In some aspects, the selection of the object may be based on input received from the user input device 240. For example, as discussed above, a user may select an object or a region of an image using the user input device 240. In some aspects, the input may specify the corners of a bounding box substantially enclosing the object. In implementations that allow a user to select a region of an image, the processor 250 may then perform object detection within the selected region to select the object in block 310.

In block 315, method 300 determines a monitor region for the object. In some aspects, a field of view of an imaging sensor may be divided into a plurality of regions. One or more of those regions may be selected as a monitor region(s) for the selected object. As discussed above, the monitored region(s) may include all or a substantial portion of the selected object. In some aspects, the, method 300 may enclose the object; for example, by generating a bounding region around the selected object within the one or more selected regions. In some aspects, the bounding region may be a minimum bounding box, and/or be shaped like a polygon or a rectangle. In some aspects, the bounding region may be aligned with the rows and columns of the image.

In block 320, method 300 focuses the camera on the object. In some aspects, the camera is focused on the object based on the monitor region(s) determined in block 315. For example, image content of the monitor regions may be evaluated to focus the camera. In an embodiment, in block 320, method 300 may step through different focal plane distances, measuring a focus parameter of the monitored regions at each of the different focus plane distances, and selecting the focus plane distance that optimizes the focus parameter to be the focus plane that focuses the camera. For example, the focus parameter may measure high frequency content at a particular focal distance. In some aspects, the camera may be focused in block 320 without consideration of one or more regions that are not part of the currently monitored regions determined in block 315 and/or 370 (discussed below). Some regions of an image may be excluded from consideration to reduce computational overhead associated with determining the best focus position for the camera. By reducing the amount of image data that needs to be processed, autofocus may be performed more quickly and efficiently.

In block 330, method 300 monitors image content of the region(s) including the object. As discussed above, method 300 may divide the captured images into non-overlapping regions. One or more of those regions may be selected for monitoring based on the location of the object selected in block 310. Other regions may be excluded from monitoring.

In decision block 340, if the image in the region has changed, the camera is refocused on the object in block 320. In some aspects, whether the region has changed in block 340 may be based on a comparison of an amount of changed image content to a threshold. For example, if the number of changed pixels exceeds the threshold, the image content of the region is considered to be changed in some implementations of decision block 340. Some aspects may determine a difference image between a current image and an image to which a previous focus was applied. Absolute values of the difference image may be summed and the sum compared to a region difference threshold to determine whether an image has sufficiently changed to warrant a refocus by block 320. In some aspects, the absolute value function may be replaced by other functions, such as squaring the difference values. In some embodiments, method 300 determines a difference in one or more sensor 230 information statistics, such as exposure or focus value. In some embodiments, it is not necessary to register images, as global motion (i.e. from jitter) would trigger refocus. If decision block 340 determines that the image in the monitored region(s) has not changed substantially (or more than a threshold), then method 300 returns to block 330, which continues to monitor the region(s) via additional sequentially captured images.

Block 350 tracks the selected object's location within the plurality of regions discussed above. Tracking the selected object's location may include generating a series of outputs that indicate a current location of the object in a corresponding series of image frames. This series of outputs may then be evaluated by decision block 360, discussed in detail below.

Block 350 may track the object's location within the plurality of regions using a variety of methods, depending on the implementation. For example, in some implementations, the object's location may be based on a computed centroid of the object. Whichever region holds the centroid of the object is the region that is monitored in these implementations. All other regions may not be monitored in this implementation.

Other aspects may track multiple regions. For example, in some aspects, all regions including at least a portion of the object or a region bounding the object may be monitored. Regions that contain no portions of the object (or region bounding the object) may not be monitored in these implementations.

In other implementations, a series of bounding regions for the object may be determined for a corresponding series of image frames. Center points of the bounding regions may be used to determine in which region(s) the object is positioned. For example, if the center enters a new region, the region(s) containing the object may be adjusted to include the region in which the center is located. Other regions may be removed from a set of region(s) including the object, for example, if those regions no longer include any portion of the selected object.

The size of the selected object may also affect the regions determined to include the object. For example, if the selected object moves toward the camera 110, it may grow larger within the field of view of the camera 110 and encompass more region(s) of the field of view 130. In this case, the region(s) containing the object may be adjusted to include new regions. Alternatively, if the selected object moves further from the camera 110, it may be included in fewer regions than previous image frames. Thus, in some implementations the region(s) determined to include the object may be adjusted to remove regions that no longer include any portion of the selected object. In other implementations, as the object moves further away, its centroid and/or center of a region bounding the object may change regions.

Decision block 360 determines whether the location of the object has changed to a different region, based on the output generated by monitoring block 330. If the current object regions generated by block 330 represent a change, the regions being monitored may be updated in block 370. In some aspects, block 370 updates a set of monitored regions to be consistent with the regions block 350 determined to include the object. Thus, in block 370, one or more other regions may be removed from the set of monitored region(s) in block 370 if, for example, they no longer include any portion of the selected object, the centroid of the object has moved to a new region, or the center of a bounding region has moved to a new region. As discussed above, regions may be added to a set of monitored regions in block 370 based on a location of a centroid of the object, a center of a bounding region substantially enclosing the object, or based on regions that include at least a portion of the object, based on implementation.

If decision block 360 determines that the object continues to exist within the currently monitored regions, then method 300 returns to block 350, which continues to track the location of the object via additional sequentially captured images.

In block 380, method 300 tracks the object size. The size of the object may be determined using a variety of methods depending on implementations. In some embodiments, the method 300 tracks the area of a bounding region enclosing the object, such as a minimum bounding box that encloses the object. The size is then based on the area of the bounding region. In some aspects, the size is determined based on an actual size of the object itself, for example, based on a number of pixels or image elements that are included in the object.

In decision block 390, method 300 determines if the object size changed between a previous focus event and the current image frame. For some embodiments, if the size of the object increased relative to a previous size measurement in a previously focused image frame by more than a size increase threshold, method 300 triggers a focus event by moving to block 320. The size increase threshold may be 1.01, 1.05, 1.1, 1.15, 1.2, 1.25, 1.3, 1.35, 1.4 or any threshold in between. For example, a threshold of 1.2 may correspond to a 20% increase in size since a previous focus event. For some embodiments, if the size of the object decreased by more than a size decrease threshold, method 300 triggers a focus event by moving to block 320. For example, in some implementations, the size decrease threshold may be 0.85, corresponding to a 15% decrease in area of the size since the last focus event. Other implementations may utilize a size decrease threshold of 0.99, 0.95 0.9, 0.8, 0.75, 0.7 or any size decrease threshold in between these values. If decision block 390 determines that the size of the object has not changed substantially (or more than a size threshold as discussed above), then method 300 returns to block 380, which continues to track the object's size by comparing the object's size in additional sequentially captured images to the object's size at a previous focus event.

FIG. 3 illustrates parallel operation of blocks 330, 350, and 380. In other implementations, these operations may be done in sequence, or in a different order. As one focus trigger is sufficient to initiate the focus operation, there may be no need to monitor the region(s), track object location, and track object size during a focus operation.

In some implementations, if method 300 can no longer identify the selected object (for example, the object moves out of view, or the object gets too small to be tracked), process 300 may return to block 310, where a new object may be selected.

Figure 4:
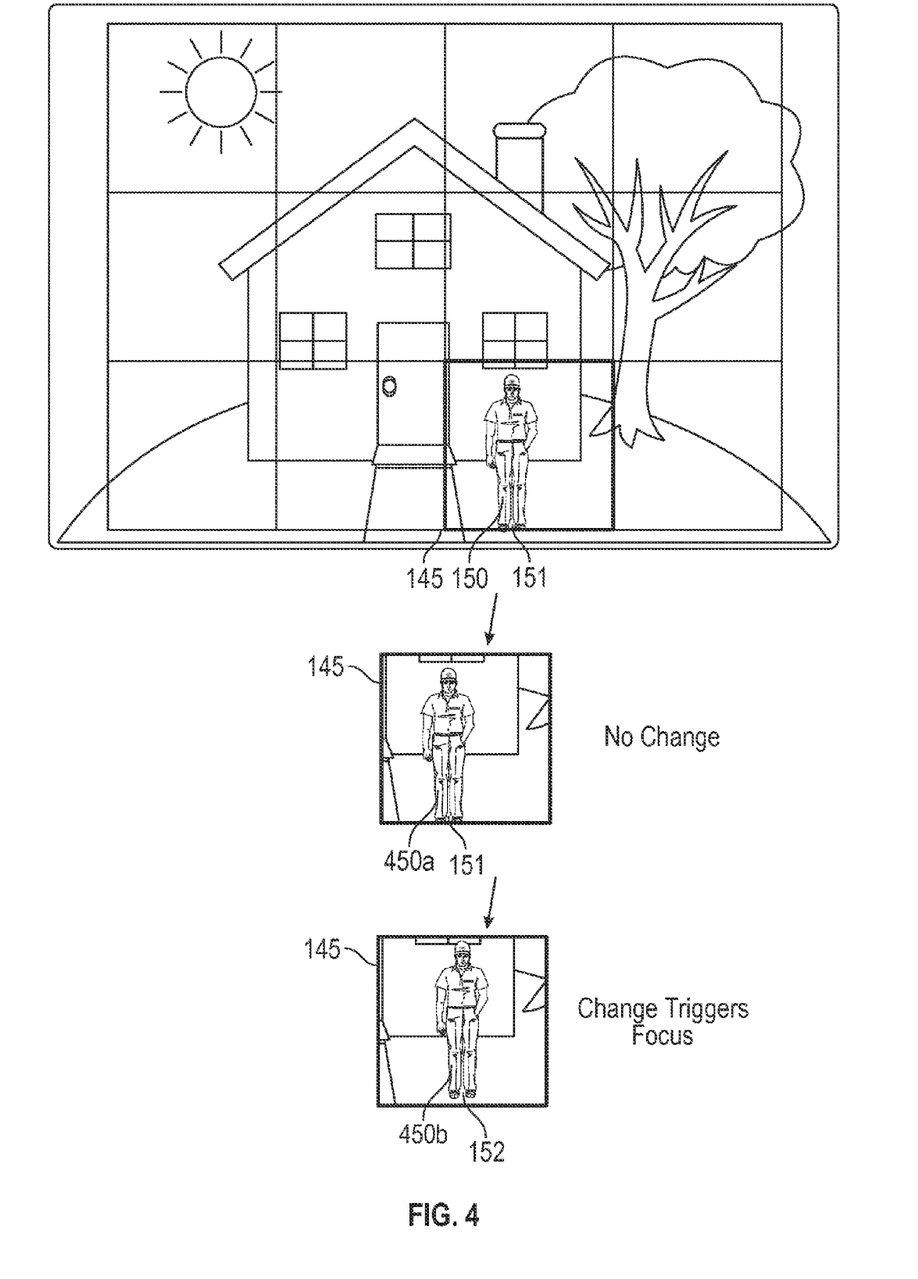
FIG. 4 is a representation of a scene including an object within a monitor region at three different times: after focusing on the object, before the object moves, and after the object moved to a new position.

FIG. 4 is a representation of a scene including an object 150/450a/450b within a monitor region 145 at three different times: after focusing on the object 150, before the object 450a moves, and after the object 450b moves. The object 150 starts at position 151 after focusing the object. The same object, represented as object 450a, remains in position 151 before moving. The same object, represented as object 450b, moves to position 152. As the image in region 145 did not change while object 450a stayed in position 151, the object stayed in focus and the processor 250 did not trigger a focus event. However, when the object moved from position 151 to position 152 the image in region 145 did change. This change triggered a focus event because the difference in image content exceeds an image difference threshold.

Figure 5:
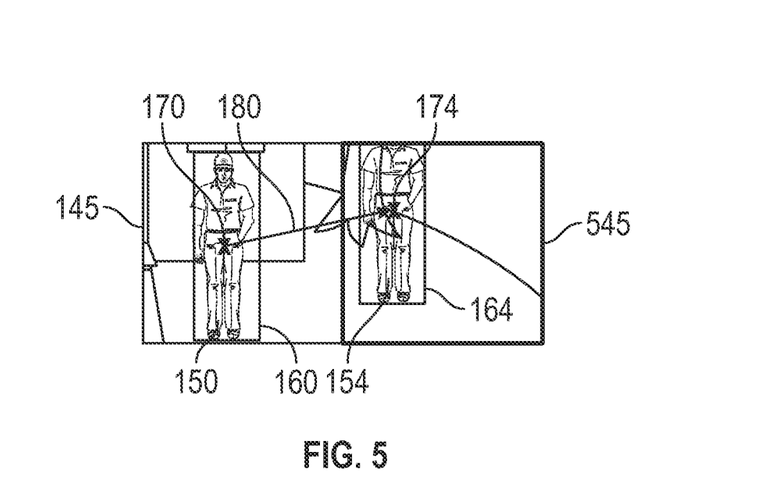
FIG. 5 is a representation of an object moving from a first position in a first monitor region in a first image, to a second position in a second monitor region in a second image, for which the change in monitor region triggers a switch in monitor regions as well as a focus event.

FIG. 5 is a representation of an object moving from a first position in a first monitor region in a first image, to a second position in a second monitor region in a second image, for which the change in monitor region triggers a switch in monitor regions as well as a focus event. FIG. 5 shows two images of an object 150 in a scene. After focus, object 150 in bounding box 160 with center point 170 is in monitor region 145. In a subsequent image, object 150 moves along arrow 180 to monitor region 545. This second image is object 154, which corresponds to the same person in the scene. This second image shows object 154 in bounding box 164 with center point 174. Because the center point of bounding box 174 is in region 545, the continuous autofocus system may switch monitor regions from region 145 to region 545 and trigger a focus event.

Figure 6:
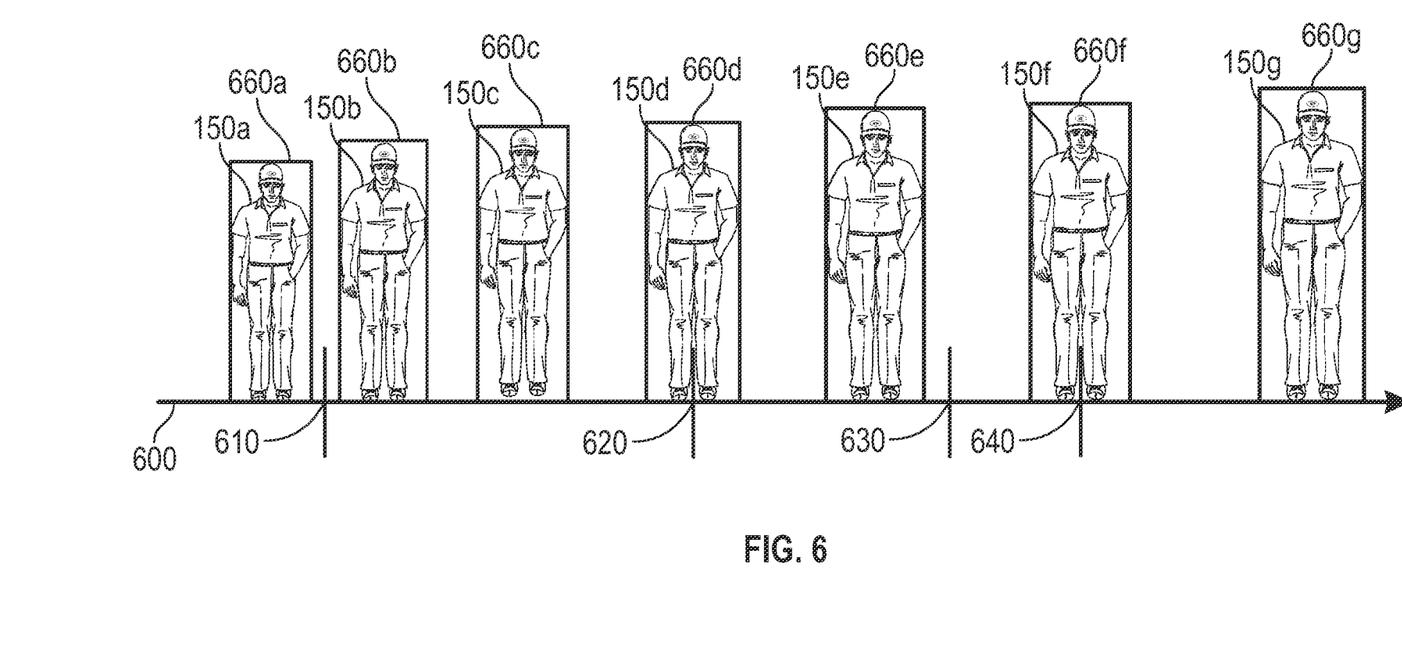
FIG. 6 shows a representation of an object within a bounding box at different size ratios as compared to a first size of the object, for which a focus event is triggered when the change in size ratio is less than a bounding box ratio decrease threshold, or when the change in size ratio is greater than a bounding box ratio increase threshold.

FIG. 6 illustrates how a change in a size of a selected object 150 can trigger a focus event. In FIG. 6, objects 150a-g are shown as the same object depicted in a variety of sizes. Each of the objects 150a-g is enclosed by a corresponding bounding box 660a-g. The object 150d represents the starting size (or position). In this example, a camera may be initially focused on object 150d. The initial focus on object 150d is represented by hash mark 620. Objects to the right of object 150d, i.e., 150e-g, are relatively larger than object 150d, while objects to the left of object 150d, i.e., 150a-c, are relatively smaller than object 150d.

In some implementations, as the size of object 150d changes in size (for example represented by positions to the right, i.e. objects 150e-g) some implementations may determine a size ratio between the object 150d and the size of, for example, object 150e. In some aspects, the size ratio is based on an area of the subjects 150d and 150e themselves. In other aspects, the size ratio is based on a ratio of an area of bounding boxes 660d and 660e. In some aspects, when the change in size or ratio is greater than a threshold, a focus event is triggered, as discussed above with respect to FIG. 4 and blocks 380 and 390.

In FIG. 6, while object 150e is larger than object 150d, the size is not substantial enough to exceed the size threshold in the illustrated implementation. Thus, the change in size between objects 150d and 150e does not trigger a focus event. However, when the object increases further in size as represented by object 150f, the difference in size between object 150d and 150f exceeds the size increase threshold, and a focus event is triggered. This is represented by hash mark 630. When the object increases further in size from 150f to 150g, no focus event is triggered. This may be due to a size ratio between the size of object 150f and 150g being less than the size ratio used in the illustrated implementation. Note that the size ratio is based on the size of the object when the last focus event was performed. Thus, the size of object 150e and the size of object 150f are both compared to the size of object 150d, since object 150d was the last object to which a focus event was applied, as represented by hash mark 620. In contrast, the size of object 150g is compared to the size of object 150f, since that was the last object to which a focus was applied, as represented by hash mark 640.

A similar process is used when an object decreases in size. For example, if object 150d changes in size to a size represented by object 150c, a size ratio may be determined between the sizes of object 150d and object 150c. This difference may be compared to a size decrease threshold, and if the difference exceeds the threshold, a focus event may be triggered. In this example, no event is triggered based on the change from 150d to 150c, based on the lack of a hash mark between objects 150d and 150c. Similarly, a further reduction in size from 150c to 150b still does not result in a focus event, as the difference in size between object 150d and 150b still does not exceed the example implementation's size threshold. However, when the object is further reduced in size as represented by object 150a, the difference between object 150a and 150d exceeds the size threshold, and a focus event is triggered, as represented by hash mark 610. Note that while both an increase in size and a decrease in size may result in a comparison between a size difference and a threshold, different thresholds may be used for each case. For example, some implementations may use a 10% increase in size, or a ratio of 1.1, to trigger a focus event and an 8% decrease in size, or a ratio of 0.92, to trigger a focus event. Other implementations may use a similar threshold for both increases and decreases in size. For example, some implementations may use a 9% increase or decrease in size to trigger a focus event.

Figure 7:
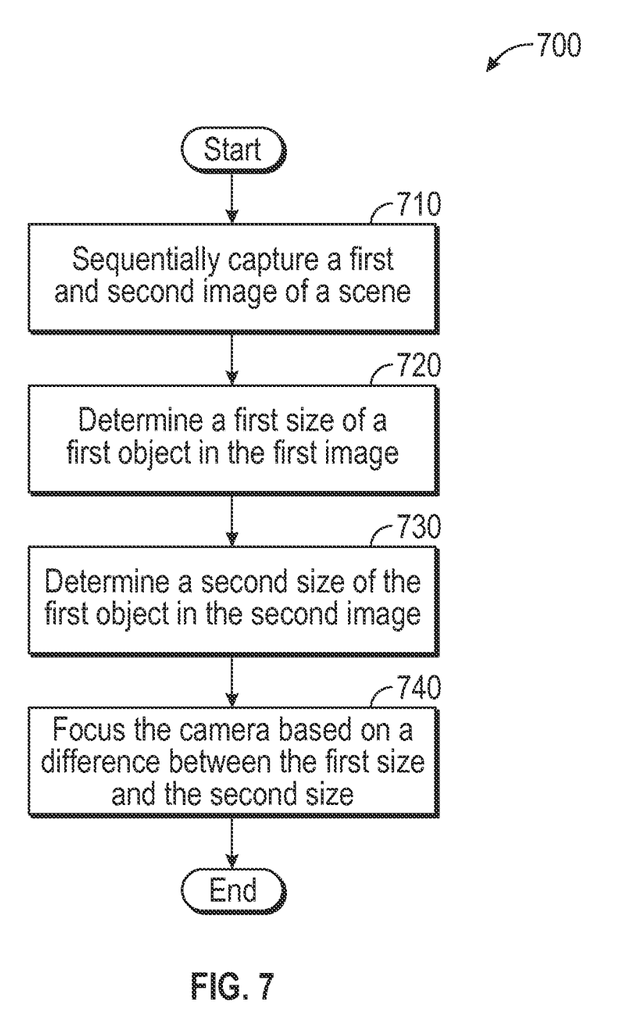
FIG. 7 is a flowchart that illustrates a method of a process for continuous autofocus according to the embodiments described herein.

FIG. 7 is a flowchart that illustrates a method 700 of continuous autofocus according to the embodiments described herein. In some aspects, instructions stored in the memory 260 of FIG. 2 configure the processor 250 to perform the functions of method 700. In some aspects, method 700 and method 300 of FIG. 3 are integrated or part of the same method. For example, the "track object size" blocks 380 and 390 of method 300 may correspond to at least blocks 720-740 of method 700, discussed below.

At block 710, method 700 sequentially captures a first and second image of a scene. In some implementations, at least some of the functionality of block 710 may be performed by camera 110 illustrated in FIG. 2. For example, in some aspects, processor instructions stored in the memory 260 may configure the processor 250 to control the camera 110 to capture the first and second images.

At block 720, method 700 determines a first size of a first object in the first image. In some implementations, the functionality of block 720 may be performed by the processor 250 illustrated in FIG. 2. As discussed above, in some aspects, the first size is based on an area of a region that bounds the first object within the first image, or based on an area of the first object itself in the first image. For example, the area may be based on a number of pixels or image elements that represent the first object within the first image.

At block 730, method 700 determines a second size of the first object in the second image. In some implementations, the functionality of block 730 may be performed by processor 250 illustrated in FIG. 2. As discussed above, in some aspects, the second size is based on an area of a region that bounds the first object within the second image, or based on an area of the first object itself in the second image.

At block 740, method 700 focuses the camera based on a difference between the first size and the second size. For example, block 740 may focus the camera as described above with respect to blocks 380 and 390 of FIG. 3 and/or FIG. 6.

In some aspects, a ratio between the size of the first image and the second image is compared to one or more thresholds. For example, in some implementations, a first threshold may be less than one, and control whether an object has been reduced in size in the second image as compared to the first image to a degree that the camera should be refocused. In this implementation the ratio may represent the size of the first object in the second image as compared to the size of the object in the first image. If this ratio is smaller than the first threshold, a focus event may be triggered. Similarly, this ratio may be compared to a second threshold larger than one. If the ratio exceeds the second threshold, some implementations may determine that the size of the object in the second image is larger than the object in the first image to such a degree that the camera should be refocused. In some implementations, one threshold could be compared to two computed ratios. For example, a first ratio could represent the first size/second size, while a second ratio represents the second size/first size.

One of skill in the art would understand that other implementations may reverse the relationships between the first and second sizes that is represented by a single computed ratio, i.e. a reverse ratio in other implementations may represent the size of the first object in the first image as compared to the size of the object in the second image. In these implementations, one of ordinary skill would understand that two thresholds could be identified to accomplish focus events as described above.

In some implementations, the functionality of block 720 may be performed by camera controller 220 illustrated in FIG. 2. In some implementations, block 720 may be performed by the processor 250 in combination with the camera controller 220. For example, the processor 250 may determine the differences between the first size and second size, and depending on how the difference compares to one or more thresholds, may command the camera controller 110 to focus the camera.

Some aspects of method 700 may include one or more of the functions discussed above with respect to blocks 330/340, and/or 350/360/370.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method of focusing a camera, comprising:
   selecting an object in an image;
   determining, using a processor, regions in the image for monitoring the object;
   sequentially capturing with the camera, using the processor, a first image and a second image of a scene that includes the object;
   determining, in the first image and the second image, a location of the object, which of one or more regions the object is in, and a size of the object, using the processor, wherein determining the size of the object comprises
      determining a first bounding region that contains the object in the first image; and
      determining a second bounding region that contains the object in the second image;
   monitoring, using the processor, the first image and the second image for each of the following conditions:
      a change in image content in the one or more regions of the first and the second images that exceeds a threshold;
      the location of the object moves from the one or more regions to another region;
      the difference between the size of the object in the first image and the size of the object in the second image exceeds a size increase threshold or a size decrease threshold, wherein determining whether the difference exceeds the size increase threshold or the size decrease threshold comprises
         determining a ratio between an area of the second bounding region and an area of the first bounding region; and
         using the ratio to determine if the difference in the size of the object in the first image compared to the size of the object in the second image exceeds the size increase threshold or the size decrease threshold; and
   focusing the camera, using the processor, when one or more of the conditions occur.

2. The method of claim 1, further comprising determining an area of the first bounding region and an area of the second bounding region, and determining if the difference in the size of the object in the first image compared to the size of the object in the second image based on the difference in the area of the first bounding region and the area of the second bounding region.

3. The method of claim 1, further comprising:
   segmenting, using the processor, the first and second image into a plurality of corresponding regions;
   determining, using the processor, a first region in the first image includes the object, and determining a second region in the second image corresponding to the first region;
   determining, using the processor, a first difference between image content in the first region and the second region; and
   determining, using the processor, if a change of image content in the first and second regions exceeds a threshold using the first difference.

4. The method of claim 3, further comprising:
   determining, using the processor, a third region in the second image includes the first object;
   capturing with the camera a third image of the object at a third time, the third time after the second time;
   determining, using the processor, a fourth region in the third image corresponding to the third region;
   determining, using the processor, a second difference between image content in the third region and the fourth region; and
   determining, using the processor, if a change in image content in the first and second images of regions that depict the object exceeds a threshold using the second difference.

5. The method of claim 1, further comprising excluding from consideration when focusing the camera, regions of the plurality of regions that are determined to not include the first object.

6. An imaging apparatus comprising:
   a camera; a processor, in communication with the camera, the processor configured to
      select an object in an image;
      determine regions in the image for monitoring the object;
      sequentially capture, with the camera, a first image and a second image of a scene that includes the object;
      determine a first bounding region containing the first object in the first image;
      determine a second bounding region containing the first object in the second image;
      determine, in the first image and the second image, a location of the object, which of one or more regions the object is in, and a size of the object;
      monitor the first image and the second image for each of the following conditions:
         a change in image content in the one or more regions of the first and the second images that exceeds a threshold;
         the location of the object moves from the one or more regions to another region;
         the difference between the size of the object in the first image and the size of the object in the second image exceeds a size increase threshold or a size decrease threshold, wherein determining whether the difference exceeds the size increase threshold or the size decrease threshold comprises
            determining a ratio between an area of the second bounding region and an area of the first bounding region; and
            using the ratio to determine if the difference in the size of the object in the first image compared to the size of the object in the second image exceeds the size increase threshold or is less than the size decrease threshold; and
   a camera controller, comprising the processor, configured to focus the camera on the object when one or more of the conditions occur.

7. The imaging apparatus of claim 6, wherein the processor is further configured to determine the size of the object in the first image based on the first bounding region and determines the size of the object in the second image based on the second bounding region.

8. The imaging apparatus of claim 6, wherein the processor is further configured to determine an area of the first bounding region and an area of the second bounding region, and to determine the difference between the size of the object in the first image and the size of the object in the second image based on a difference between the area of the first bounding region and the area of the second bounding region.

9. The imaging apparatus of claim 6, wherein the processor, to determine a change in the image content in the first and the second images of regions of regions that depict the object exceeds the threshold, is further configured to:
  segment the first and second image into a plurality of corresponding regions,
  determine a first region in the first image includes the object, and determine a second region in the second image corresponding to the first region,
  determine a first difference between image content in the first region and the second region, and
  use the first difference to determine if a change in image content in the first and second images of the one or more regions exceeds the threshold.

10. The apparatus of claim 9, wherein the processor is further configured to exclude from consideration, when focusing the camera, regions that are determined to not include the first object.

11. The apparatus of claim 9, wherein the processor is further configured to:
  determine a third region in the second image includes the first object,
  capture a third image of the object after capturing the second image;
  determine a fourth region in the third image corresponding to the third region;
  determine a second difference between image content in the third region and the fourth region; and
  use the second difference to determine if a change in image content in the third and fourth regions exceeds the threshold.

12. An imaging apparatus comprising:
  means for selecting an object in an image;
  means for determining regions in the image for monitoring the object;
  means for capturing a first image and a second image of a scene that includes the object;
  means for determining, in the first image and the second image, a location of the object, one or more regions the object is in, and a size of the object, wherein determining the size of the object comprises
    determining a first bounding region that contains the object in the first image; and
    determining a second bounding region that contains the object in the second image;
  means for monitoring the first and second image for each of the following conditions:
    a change in image content in the one or more regions of the first and the second images that exceeds a threshold;
    the location of the object moves from one region to another region;
    the difference between the size of the object in the first image and the size of the object in the second image exceeds a size increase threshold or a size decrease threshold; and
  means for focusing the capturing means on the object when one or more of the conditions occur.

13. The apparatus of claim 12,
  wherein the capturing means comprises a camera,
  wherein the means for determining the location of the object, which region the object is in, and the size of the object comprises a processor; and wherein the focusing means comprises a processor.

14. A non-transitory computer-readable medium storing instructions that when executed cause a processor to perform a method of focusing a camera, the method comprising:
  selecting an object in an image;
  determining regions in the image for monitoring the object;
  sequentially capturing, with the camera, a first image and a second image of a scene that includes the object;
  determining, in the first image and the second image, a location of the object, which of one or more regions the object is in, and a size of the object, wherein determining the size of the object comprises
    determining a first bounding region that contains the object in the first image; and
    determining a second bounding region that contains the object in the second image;
  monitoring the first image and the second image for each of the following conditions:
    a change in image content in the one or more regions of the first and the second images that exceeds a threshold;
    the location of the object moves from one or more regions to another region;
    the difference between the size of the object in the first image and the size of the object in the second image exceeds a size increase threshold or a size decrease threshold, wherein determining whether the difference exceeds the size increase threshold or the size decrease threshold comprises
      determining a ratio between an area of the second bounding region and an area of the first bounding region; and
      using the ratio to determine if the difference in the size of the object in the first image compared to the size of the object in the second image exceeds the size increase threshold or is less than the size decrease threshold; and
  focusing the camera on the object when one or more of the conditions occur.

15. The non-transitory computer-readable medium of claim 14, wherein the method further comprises determining the area of the first bounding region and the second bounding region, and determining if the size of the object in the first image differs from the size of the object in the second image based on the difference in the area of the first bounding region and the area of the second bounding region.

* * * * *